(12) United States Patent
Barto

(10) Patent No.: US 10,994,210 B1
(45) Date of Patent: May 4, 2021

(54) MOBILE GAME USING IMAGE EXTRACTION

(71) Applicant: Erick Barto, San Francisco, CA (US)

(72) Inventor: Erick Barto, San Francisco, CA (US)

( * ) Notice: Subject to any disclaimer, the term of this patent is extended or adjusted under 35 U.S.C. 154(b) by 8 days.

(21) Appl. No.: 16/751,021

(22) Filed: Jan. 23, 2020

(51) Int. Cl.
*A63F 13/80* (2014.01)
*A63F 13/795* (2014.01)
*A63F 13/655* (2014.01)
*A63F 13/335* (2014.01)
*G06Q 50/00* (2012.01)

(52) U.S. Cl.
CPC ............ *A63F 13/80* (2014.09); *A63F 13/335* (2014.09); *A63F 13/655* (2014.09); *A63F 13/795* (2014.09); *G06Q 50/01* (2013.01); *A63F 2300/556* (2013.01); *A63F 2300/572* (2013.01); *A63F 2300/695* (2013.01); *A63F 2300/8064* (2013.01)

(58) Field of Classification Search
CPC ...... A63F 13/80; A63F 13/335; A63F 13/655; A63F 13/795; A63F 2300/556; A63F 2300/572; A63F 2300/695; A63F 2300/8064; G06Q 50/01
USPC .......................................................... 463/9
See application file for complete search history.

(56) References Cited

U.S. PATENT DOCUMENTS

| | | | |
|---|---|---|---|
| 7,660,468 B2* | 2/2010 | Gokturk | G06F 16/5862 382/224 |
| 8,712,862 B2* | 4/2014 | Gokturk | G06Q 30/0643 705/26.1 |
| 9,753,948 B2* | 9/2017 | Lo | G06K 9/6247 |
| 2004/0128152 A1 | 7/2004 | Austin et al. | |
| 2008/0227549 A1* | 9/2008 | Itskov | G07F 17/3276 463/42 |
| 2010/0099471 A1* | 4/2010 | Feeney | G06Q 30/02 463/1 |
| 2012/0302337 A1 | 11/2012 | Thakkar et al. | |
| 2017/0228819 A1 | 8/2017 | Shenkar et al. | |

* cited by examiner

*Primary Examiner* — Allen Chan
(74) *Attorney, Agent, or Firm* — Diament Patent Law, PC.; Adam Diament

(57) ABSTRACT

The present invention is a system and method for providing an online game implemented by means of a computer system. The method includes the step of storing a plurality of images in at least one computing device. The method then includes the step of obtaining content data from the plurality of images stored in the computing device through a content extraction module. The method includes the step of facilitating the users to initiate a challenge for each other to create a game session over a game networking system through a challenge creation module. The game session includes a friend game session and a date game session. The method includes the step of initiating the game session created by the challenge creation module over the game networking system through a gaming module.

8 Claims, 11 Drawing Sheets

MOBILE GAME USING IMAGE EXTRACTION

CROSS-REFERENCE TO RELATED APPLICATIONS

None.

FEDERALLY SPONSORED RESEARCH OR DEVELOPMENT

None.

REFERENCE TO A SEQUENCE LISTING, A TABLE, OR A COMPUTER PROGRAM LISTING COMPACT DISK APPENDIX

None.

TECHNICAL FIELD

The present invention relates to an online game implemented by means of a computer system, in particular, to image extraction mobile phone game.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

With the advent of digitalization, there is a growing fascination and participation with mobile games that are played over mobile phones and the internet. Mobile games including but not limited to are simple text-based games to games incorporating complex images and virtual worlds populated by many users or players simultaneously. Many mobile games have associated online communities that make online games a form of social activity or interaction for the players or participants.

US patent publication number US 2012/0302337A1 filed by Thakkar; Vijay; et al. discloses an online game mechanic that matches requests and responses of different data types that include text, image, and audio. The online game mechanic disclosed in Thakkar; Vijay; et al. requests values corresponding to a first data type which is sent to the users in a distribution list, and those users send response values corresponding to a second data type. Winning response values are selected and announced. In an exemplary embodiment, the request values include a text description and include at least one word, and the response values include an image file or a reference to an image file. This specification recognizes that an effective, responsive, real-time, and engaging mobile game is required, and it is a challenge to present a mobile game that uses image extraction to create and initiate game sessions in real-time.

SUMMARY

The present invention mainly cures and solves the technical problems existing in the prior art. In response to these problems, the present invention provides an online game implemented by means of a computer system.

The present invention provides a method for providing an online game implemented by means of a computer system. The method includes the step of storing a plurality of images in at least one computing device. The method then includes the step of obtaining content data from the plurality of images stored in the computing device through a content extraction module. The method includes the step of facilitating the users to initiate a challenge for each other to create a game session over a game networking system through a challenge creation module. The game session includes a friend game session and a date game session. The method includes the step of initiating the game session created by the challenge creation module over the game networking system through a gaming module.

In an aspect, the content extraction module performs a first plurality of steps to obtain content data from the plurality of images stored in the computing device. The first plurality of steps initiates with a step of installing a mobile application on the computing device and allowing the mobile application to access the images stored in the computing device. The content extraction module includes a step of extracting the image from the computing device by the mobile application. The content extraction module includes a step of processing the images through one or more open-source algorithms to obtain content data for each image. The content extraction module includes a step of evaluating the content data through a text algorithm to create a user profile report. The content extraction module includes a step of transmitting the user profile report to an application server and storing the user profile report in a user profile database.

In an aspect, the challenge creation module performs a second plurality of steps to facilitate the users to initiate the challenge. The second plurality of steps initiates with to step of allowing the mobile application to access a plurality of contacts stored in the computing device of the users. The challenge creation module includes a step of selecting and referring the users from the contacts to initiate the challenge by the user. The users are categorized as one or more first users who initiate the challenge and one or more second users selected and referred by the first user to accept the challenge. The challenge creation module includes a step of determining if the mobile application is installed in the computing device of the second user. The challenge creation module includes a step of sending a request signal to the second user to accept the challenge initiated by the user via the application server on determining that the mobile application is installed in the computing device of the second user. The challenge creation module sends an invite signal through one or more messaging platforms to the second user to install the mobile application if the mobile application is not installed in the computing device of the second user and stores the challenge in the application server. The stored challenge is transmitted to the computing device of the second user when the application server acknowledges the installation of the mobile application in the computing device of the second user. If the second user does not accept the challenge the challenge process is terminated and no game session is created. The challenge creation module includes a step of sending a notification signal to the second user to accept the challenge through the application server. The challenge creation module creates the friend game session on determining phone numbers corresponding to the first user and the second user are stored in the computing devices corresponding to the first user and the second user.

The challenge creation module creates the date game session on determining phone numbers corresponding to the first user and the second user are not stored in the computing devices corresponding to the first user and the second user.

In an aspect, the gaming module performs a third plurality of steps to initiate the game session. The third plurality of steps initiates with a step of receiving the request signal by the application server to initiate the game session between the first user and the second user. The gaming module includes a step of examining if phone numbers of the first user and the second user are stored in the computing devices corresponding to the first user and the second user to determine whether to create the friend game session or the dating game session. The gaming module includes a step of extracting the user profile reports for the first user and the second user from the user profile database. The gaming module includes a step of comparing both the user profile report to create a question database specific to the first user and the second user through an algorithmic module. The question database includes a finite number of questions to confirm statistical data obtained from the content data pertaining to the images extracted from the computing device. The gaming module includes a step of selecting a discrete number of questions from the question database through a software module, wherein the selected discrete number of questions act as a game session questionnaire for the first user and the second user. The gaming module includes a step of initiating the game session when the application server transmits the first question to the computing device of one of the users. The initiation of the game session is notified to the first user and the second user. The gaming module includes a step of comparing the user profile reports of the first user and the second user to create a clues and questions database specific to the first user and the second user, wherein the clues and questions database comprising a finite number of clues to expose statistical data and questions to confirm other statistical data obtained from the content data pertaining to the images extracted from the computing device. The gaming module includes a step of selecting a discrete number of questions from the clues and questions database. The selected discrete number of questions act as a dating game session questionnaire for the first user and the second user. The gaming module includes a step of initiating the game session when the application server sends the first clues to one of the first user and the second user. The initiation of the game session is notified to the first user and the second user.

Another aspect of the present invention relates to online game implemented by means of a computer system includes at least one computing device, a game networking system, an application server, a processor, and a memory communicatively coupled to the processor. The computing devices are associated with the users to store a plurality of images. The game networking system accessible by a plurality of users connected over a network. The application server including user input data, and image extraction data pertaining to the images stored in the computing devices corresponding to each user. The memory stores instructions executed by the processor. The memory includes a content extraction module, a challenge creation module, and a gaming module. The content extraction module obtains content data from the plurality of images stored in the computing device. The challenge creation module facilitates the users to initiate a challenge for each other to create a game session over the game networking system. The game session includes a friend game session and a date game session. The gaming module initiates the game session created by the challenge creation module over the game networking system.

Accordingly, one advantage of the present invention is that it provides an online game mechanic that uses image content stored in the computing device of the user. In an exemplary aspect, the images are extracted via machine learning models, to create questions specific to each of two users who are opponents and who may or may not know each other. These questions are to be answered by the second user or opponent user. In an exemplary aspect, where the users know each other, the image content extracted from the computing device will recognize that the user has a number of pictures which are tagged with the label "dog" from the machine learning models, and a number of pictures which are tagged with the label "cat", the opponent User will be asked "does the opponent user have more pictures of dogs or cats?". In another exemplary aspect, the image content extracted from the computing devices of both the users will recognize that first user has a number of pictures which are tagged with the label "muscle" from the machine learning models, from which it is inferred that the image was taken while exercising, while the second user has a different number of pictures with the same label. Either user may be asked, "who has more pictures exercising, you or your opponent?". After the user answers the question they will be provided with the correct answer. A game session for two users who know each other will comprise of a series of questions of the above-mentioned nature and the winner will be the user who answers most questions correctly. In an exemplary aspect, where the users do not know each other, both the users may be provided clues for each question which are taken from data also extracted from the computing devices of the users, in order to have a better chance of answering correctly. For example, the image content extracted from the user's computing device will recognize that the first user has a number of images which are tagged with the label "sushi" from the machine learning models, a number of images which are tagged with the label "vegetables", and a number of images which are tagged with the label "pizza". The second user will be presented with the three numbers of pictures for each label as clues. Both the users will also have a number of images tagged with the more general label "food", which encompasses the images with the labels "sushi", "vegetables", "pizza" as well as more images with other types of foods. The second user may be asked, "who has taken more pictures of food?". After the user answers the question correctly they will be provided with the correct answer. A game session for two users who do not know each other will comprise of a series of clues and questions of the above-mentioned nature and the winner will be the User who answers most questions correctly.

Accordingly, one advantage of the present invention includes, without limitation, it provides a game mechanic that allows two people to get to know each other more deeply, as well as sharing images they care about with each other in a dynamic way.

Accordingly, one advantage of the present invention is that it enables the users to explore the image content stored in their own computing devices and in their friends' computing devices.

Other features of embodiments of the present invention will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION OF THE EMBODIMENTS

Figure 1:
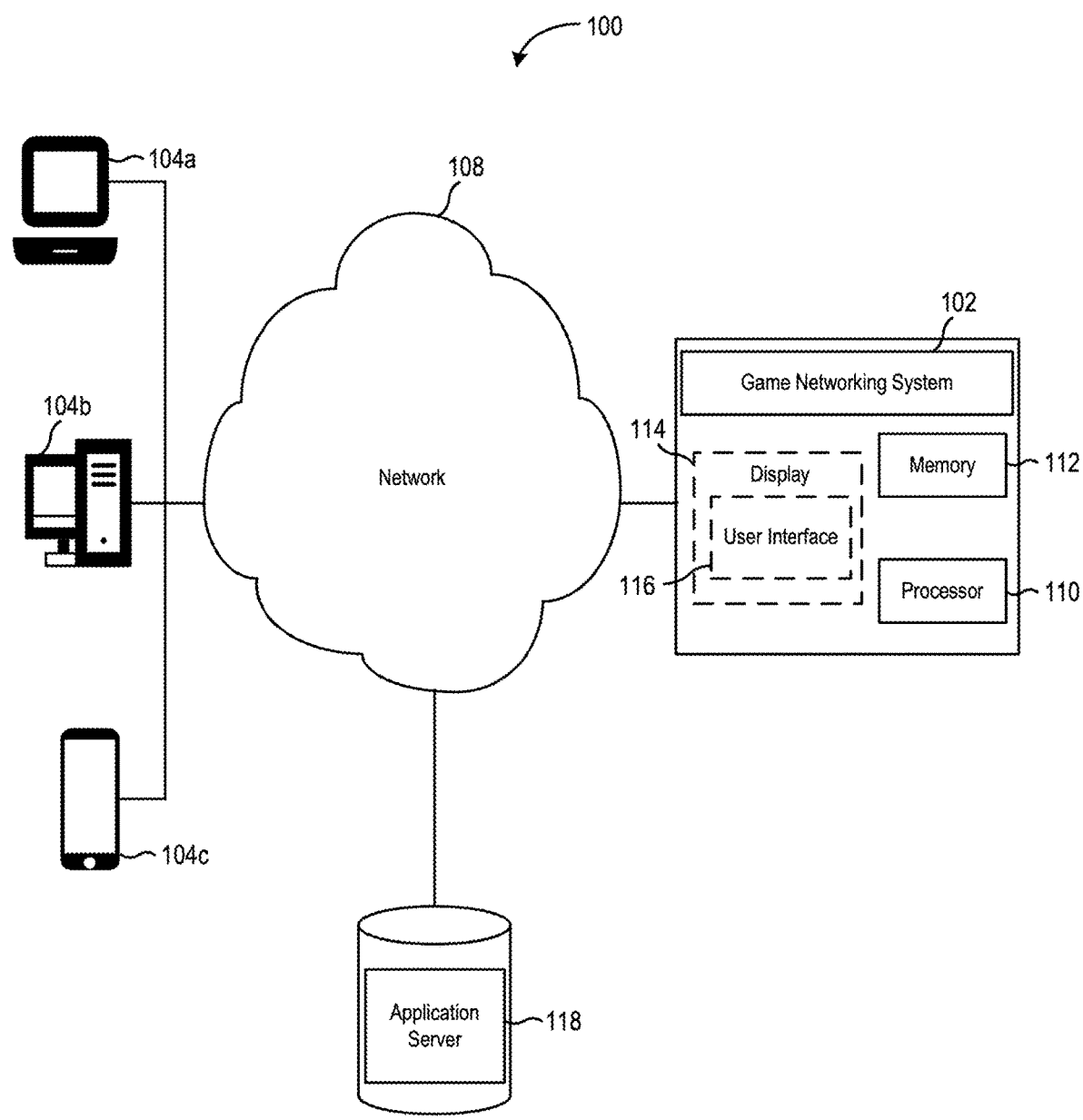
FIG. 1 illustrates a block diagram of the present online game implemented by means of a computer system, in accordance with one embodiment of the present invention.

The present invention is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Although the present invention has been described with the purpose of disclosing a mobile game that uses image extraction from the computing devices of the users or players, it should be appreciated that the same has been done merely to illustrate the invention in an exemplary manner and to highlight any other purpose or function for which explained structures or configurations could be used and is covered within the scope of the present invention.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory or memory devices.

FIG. 1 illustrates a block diagram 100 of the present online game implemented by means of a computer system, in accordance with one embodiment of the present invention. The online game implemented by means of the computer system includes at least one computing device 104a, 104b, and 104c, a game networking system 102, an application server 118, a processor 110, and a memory 112 communicatively coupled to the processor. The computing devices 104a, 104b, and 104c are associated with the users to store a plurality of images. Examples of the computing devices 104 or user devices include but are not limited to a laptop 104a, a desktop 104b, and a smartphone 104c. Other examples of a plurality of computing devices 104, may include but are not limited to a phablet and a tablet.

The game networking system 102 accessible by a plurality of users connected over a network 108. In an embodiment, the game networking system 102 is a platform may couple with the computing devices 104a, 104b, and 104c over the network 108. Network 108 may be a wired or a wireless network, and the examples may include but are not limited to the Internet, Wireless Local Area Network (WLAN), Wi-Fi, Long Term Evolution (LTE), Worldwide Interoperability for Microwave Access (WiMAX), and General Packet Radio Service (GPRS).

The application server 118 including user input data, and image extraction data pertaining to the images stored in the computing devices 104a, 104b, and 104c corresponding to each user. The application server 118 may be part of a server farm or similar infrastructure (e.g. cloud) providing one or more hosted services to the users or players accessing the gaming services through mobile or software applications executed on the computing devices 104.

In operation, when the user (e.g. player) of a mobile phone 104c, for example, wants to visualize the challenges and data related to the present game, the mobile phone communicates the same with the game networking system 102, via network 108. The game networking system 102 may present the challenges and game-related data as per the user's request. The processor 110 that is communicatively coupled to a memory 112, which may be a non-volatile memory or a volatile memory. Examples of non-volatile memory may include, but are not limited to flash memory, a Read Only Memory (ROM), a Programmable ROM (PROM), Erasable PROM (EPROM), and Electrically EPROM (EEPROM) memory. Examples of volatile memory may include but are not limited Dynamic Random Access Memory (DRAM), and Static Random-Access memory (SRAM).

Processor 110 may include at least one data processor for executing program components for executing user- or system-generated requests. A user may include a person or player, a person using a device such as those included in this invention, or such a device itself. Processor 110 may include specialized processing units such as integrated system (bus) controllers, memory management control units, floating point units, graphics processing units, digital signal processing units, etc.

Processor 110 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 110 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 110 may be disposed of in communication with one or more input/output (I/O) devices via an I/O interface. I/O interface may employ communication protocols/methods such as, without limitation, audio, analog, digital, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Memory 112 further includes various modules that enable the game networking system 102 for presenting game-related data, challenges, cues, and questions to the players. These modules are explained in detail in conjunction with FIG. 2. The game networking system 102 may further include a display 114 having a User Interface (UI) 116 that may be used by a user or an administrator or the player to initiate a request to start the game or view the game-related information to the game networking system 102. In an embodiment, the User Interface (UI or GUI) 116 is a convenient interface for accessing the information related to the game, including the terms and conditions of the game, privacy and security terms. Display 114 may further be used to display various modules and actions pertaining to the game performed by the users. The functionality of the game networking system 102 may alternatively be configured within each of plurality of computing devices 104.

Figure 2:
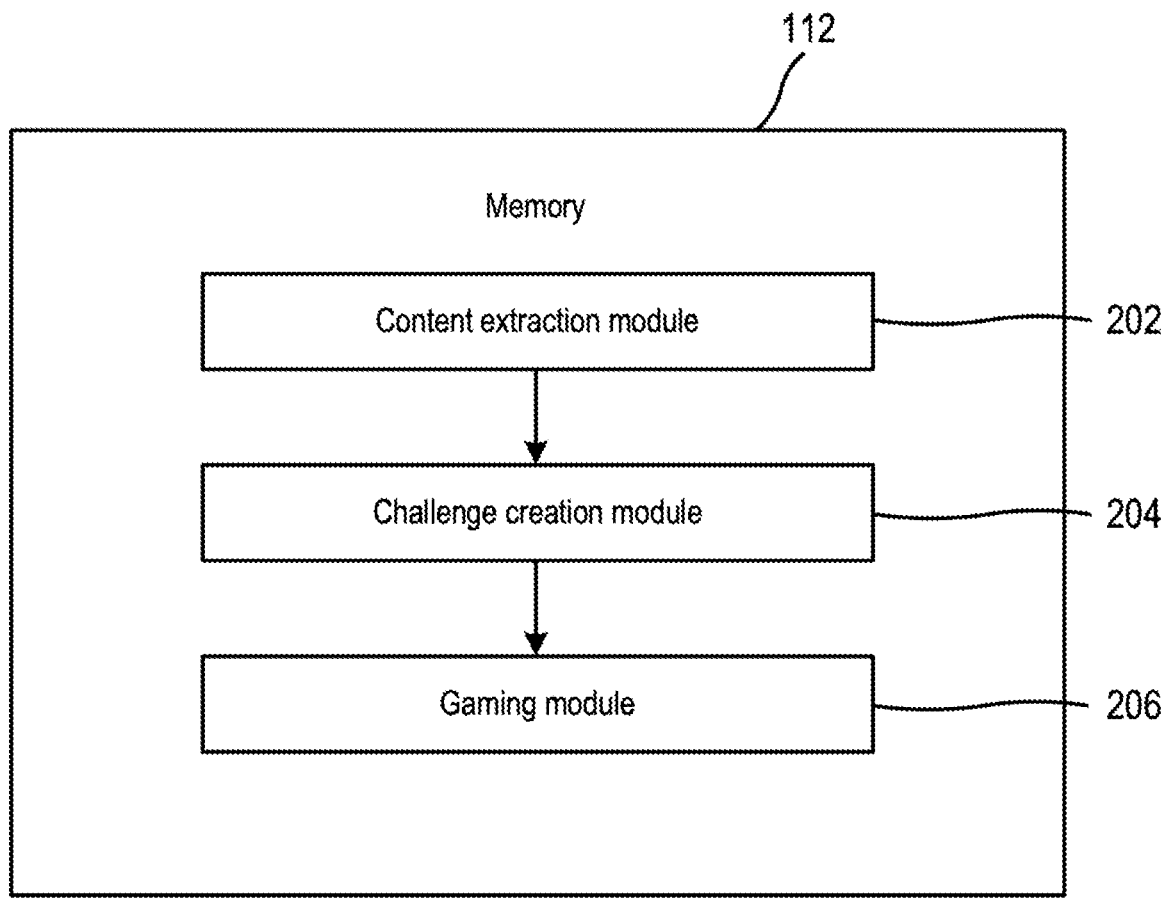
FIG. 2 illustrates a block diagram of the various modules within the memory, in accordance with another embodiment of the present invention.

FIG. 2 illustrates a block diagram of the various modules within memory 112, in accordance with another embodiment of the present invention. FIG. 2 is explained in conjunction with FIG. 1. The memory 112 includes a content extraction module 202, a challenge creation module 204, and a gaming module 206. The content extraction module 202 obtains content data from the plurality of images stored in the computing device. The challenge creation module 204 facilitates the users to initiate a challenge for each other to create a game session over the game networking system. The game session includes a friend game session and a date game session. The gaming module 206 initiates the game session created by the challenge creation module over the game networking system.

Figure 3:
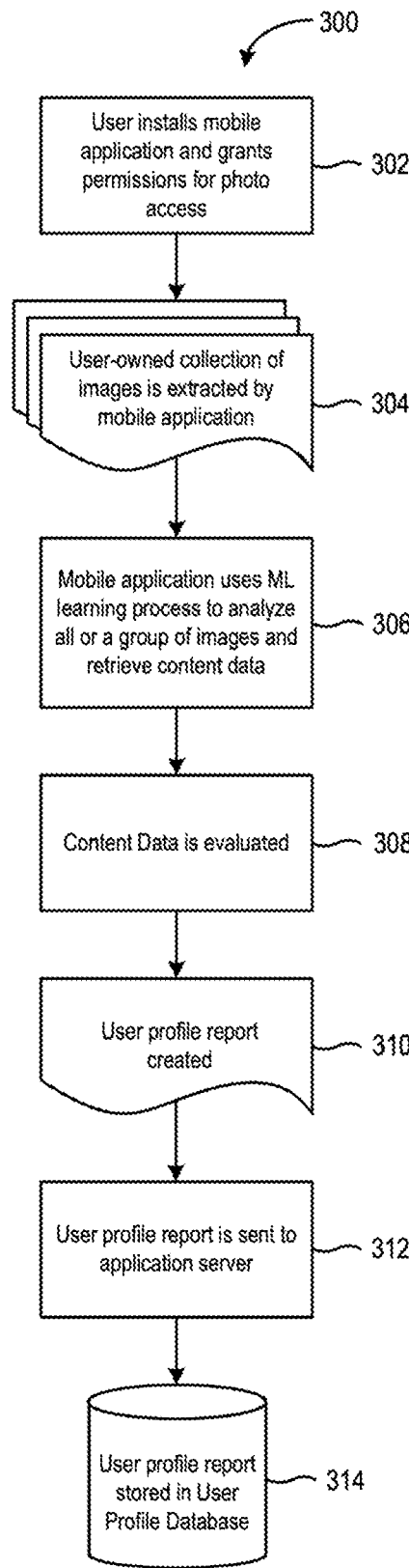
FIG. 3 illustrates a flowchart of a first plurality of steps performed by the content extraction module to obtain content data from the plurality of images stored in the computing device in yet another embodiment of the present invention.

FIG. 3 illustrates a flowchart 300 of a first plurality of steps performed by the content extraction module 202 to obtain content data from the plurality of images stored in the computing device in yet another embodiment of the present invention. FIG. 3 is explained in conjunction with FIG. 2. The first plurality of steps initiates with a step 302 of installing a mobile application on the computing device and allowing the mobile application to access the images stored in the computing device. The content extraction module includes a step 304 of extracting the image from the computing device by the mobile application. The content extraction module includes a step 306 of processing the images through one or more open-source algorithms (such as Google's ML Kit, or Apple's Core ML) to obtain content data for each image. The content extraction module includes a step 308 of evaluating the content data through a text algorithm and at step 310 creates a user profile report. The content extraction module includes a step 312 of transmitting the user profile report to the application server and storing the user profile report in a user profile database 314.

Figure 4:
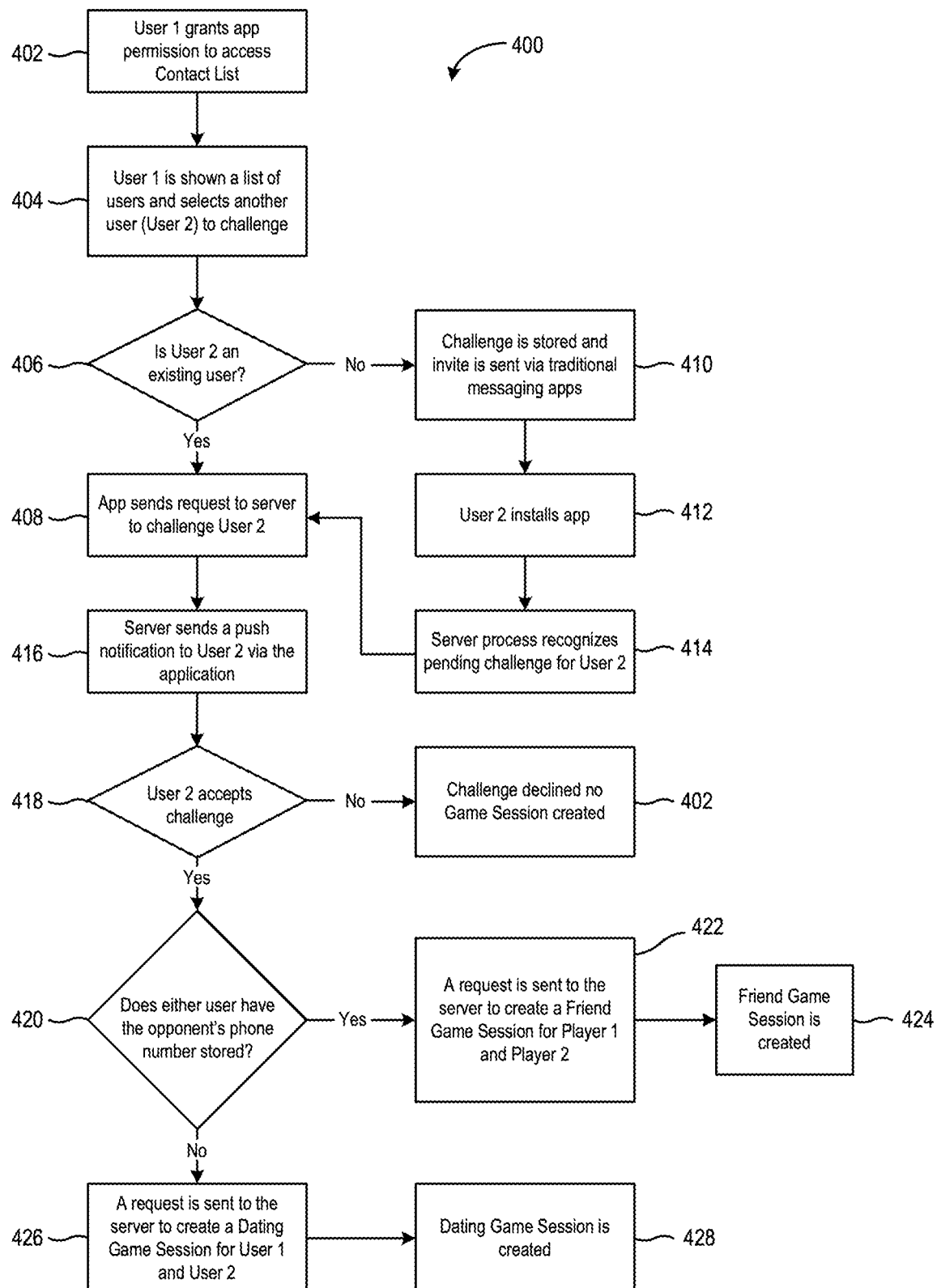
FIG. 4 illustrates a flowchart of a second plurality of steps performed by the challenge creation module to facilitate the users to initiate the challenge a further embodiment of the present invention.

FIG. 4 illustrates a flowchart 400 of the second plurality of steps performed by the challenge creation module 204 to facilitate the users to initiate the challenge in a further embodiment of the present invention. FIG. 4 is explained in conjunction with FIG. 2. The second plurality of steps initiates with to step 402 of allowing the mobile application to access a plurality of contacts stored in the computing device of the first user. The challenge creation module includes a step 404 of selecting and referring the users from the contacts to initiate the challenge by the user. The users are categorized as one or more first users who initiate the challenge and one or more second users selected and referred by the first user to accept the challenge. The challenge creation module includes a step 406 of determining if the mobile application is installed in the computing device of the second user. The challenge creation module includes a step 408 of sending a request signal to the second user to accept the challenge initiated by the user via the application server on determining that the mobile application is installed in the computing device of the second user. At step 410, the challenge creation module sends an invite signal through one or more messaging platforms such as WhatsApp, email, SMS, social media platforms etc. to the second user to install the mobile application if the mobile application is not installed in the computing device of the second user and stores the challenge in the application server. At step 412, the second user installs the mobile application in his/her computing device. At step 414, the stored challenge is transmitted to the computing device of the second user when the application server acknowledges the installation of the mobile application in the computing device of the second user. If the second user does not accept the challenge the challenge process is terminated and no game session is created. The challenge creation module includes a step 416 of sending a notification signal (e.g. a push notification) to the second user to accept the challenge through the application server at step 418. At step 420, the challenge creation module determines whether either of the users stored the phone numbers of each other in their computing devices. At step 422, the challenge creation module sends a request to create the friend game session on determining phone numbers corresponding to the first user and the second user are stored in the computing devices corresponding to the first user and the second user. At step 424, the challenge creation module creates the friend game session. At step 426, the challenge creation module sends a request to create the date game session on determining phone numbers corresponding to the first user and the second user are not stored in the computing devices corresponding to the first user and the second user. At step 428, the challenge creation module creates the date game session.

Figure 5:
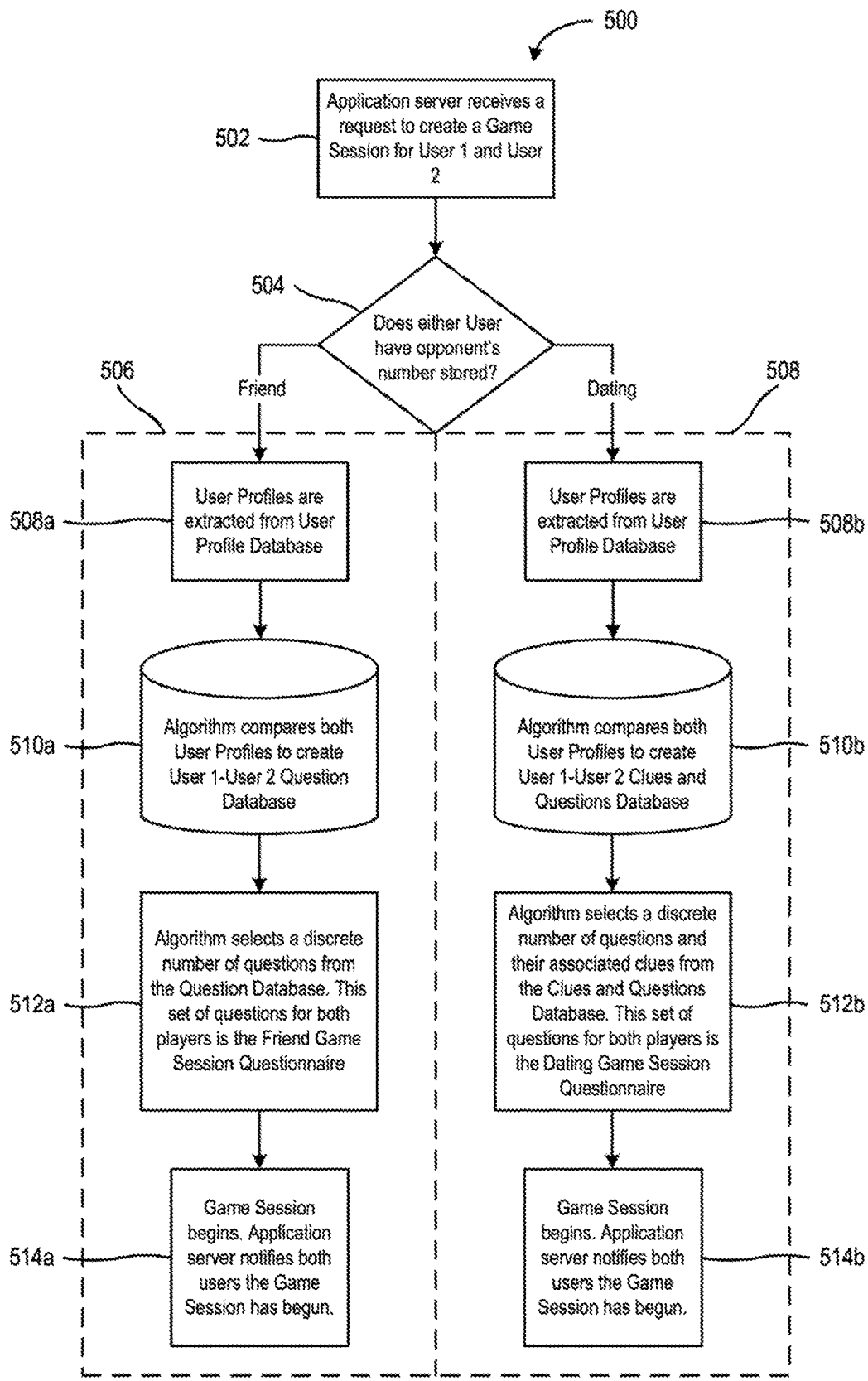
FIG. 5 illustrates a flowchart of a third plurality of steps performed by the gaming module to initiate the game session in yet another embodiment of the present invention.

FIG. 5 illustrates a flowchart 500 of a third plurality of steps performed by the gaming module 206 to initiate the game session in yet another embodiment of the present invention. FIG. 5 is explained in conjunction with FIG. 2. The third plurality of steps initiates with a step 502 of receiving the request signal by the application server to initiate the game session between the first user and the second user. The gaming module includes a step 504 of examining if phone numbers of the first user and the second user are stored in the computing devices corresponding to the first user and the second user to determine whether to create the friend game session 506 or the dating game session 508. The gaming module includes a step 508a, and 508b of extracting the user profile reports for the first user and the second user from the user profile database. The gaming module includes a step 510a of comparing both the user profile report to create a question database specific to the first user and the second user through an algorithmic module. The question database includes a finite number of questions to confirm statistical data obtained from the content data pertaining to the images extracted from the computing device. The gaming module includes a step 512a selecting a discrete number of questions from the question database through a software module. The selected discrete number of questions act as a game session questionnaire for the first user and the second user. The gaming module includes a step 514a of initiating the game session when the application server transmits the first question to the computing device of one of the users. The initiation of the game session is notified to the first user and the second user. The gaming module includes a step 510b of comparing the user profile reports of the first user and the second user to create clues and questions database specific to the first user and the second user. The clues and questions database comprising a finite number of clues to expose statistical data and questions to confirm other statistical data obtained from the content data pertaining to the images extracted from the computing device. The gaming module includes a step 512b of selecting a discrete number of questions from the clues and questions database. The selected discrete number of questions act as a dating game session questionnaire for the first user and the second user. The gaming module includes a step 514b of initiating the game session when the application server sends the first clues to one of the first user and the second user. The initiation of the game session is notified to the first user and the second user.

Figure 6:
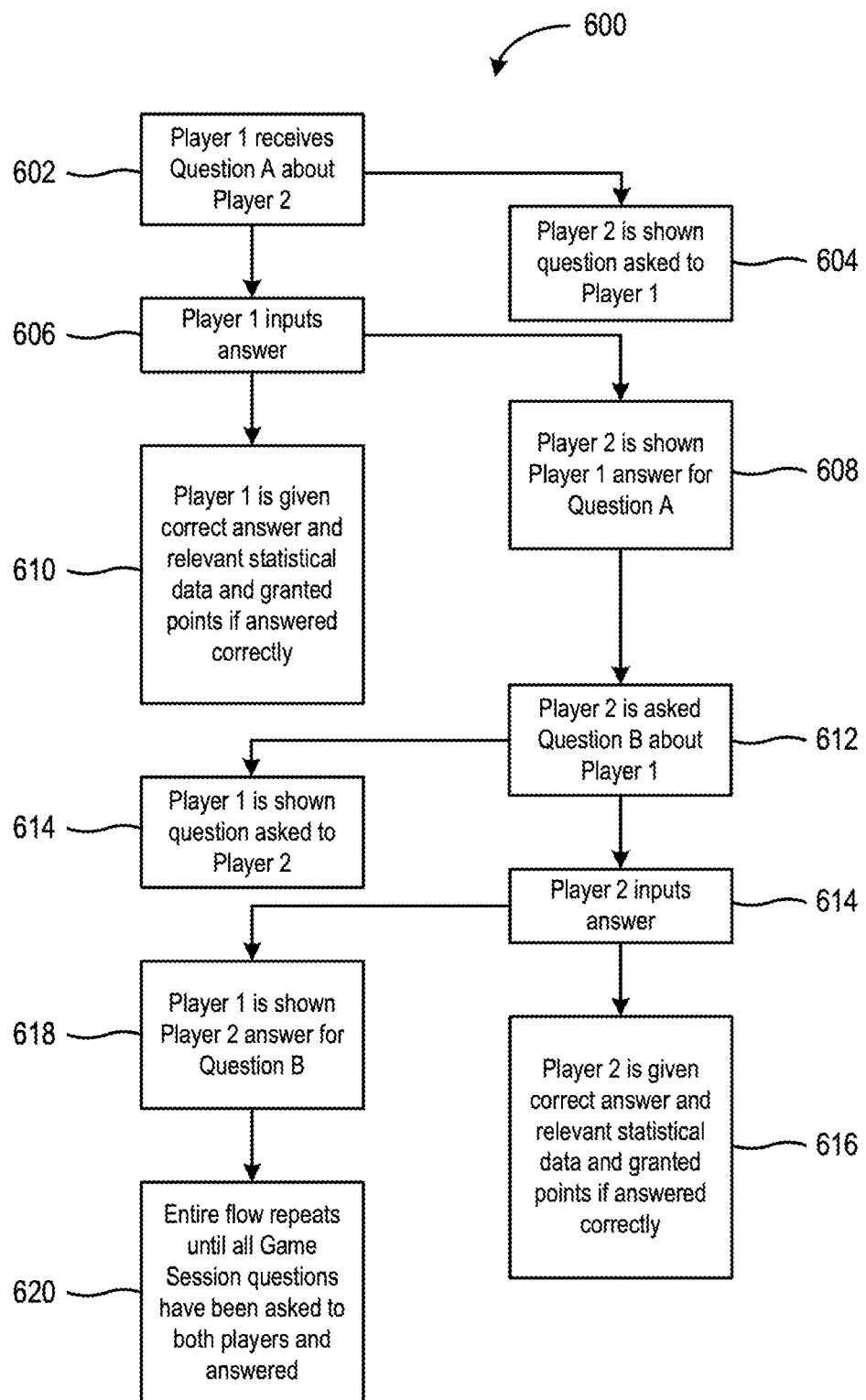
FIG. 6 illustrates a flowchart of a portion of a friend game session in yet another embodiment of the present invention.

FIG. 6 illustrates a flowchart 600 of a portion of a friend game session in yet another embodiment of the present invention. At step 602, the first user receives question A about the second user. At step 604, the second user is shown the question asked to the first user. At step 606, the first user inputs an answer. At step 610, the first user is given the correct answer with relevant statistical data and granted points if answered correctly. At step 608, the second user is shown the first user's answer to question A. At step 612, the second user is then asked question B about the first user. At step 614, the first user is shown the question asked to the second user. At step 616, the second user inputs an answer and the first user is given the correct answer with relevant statistical data and granted points if answered correctly. At step 618, the second user is shown the answer by the first user. At step 620, the process repeats alternating questions between the first user and the second user until all of the questions of the game sessions have been asked and answered by both the users.

Figure 7A:
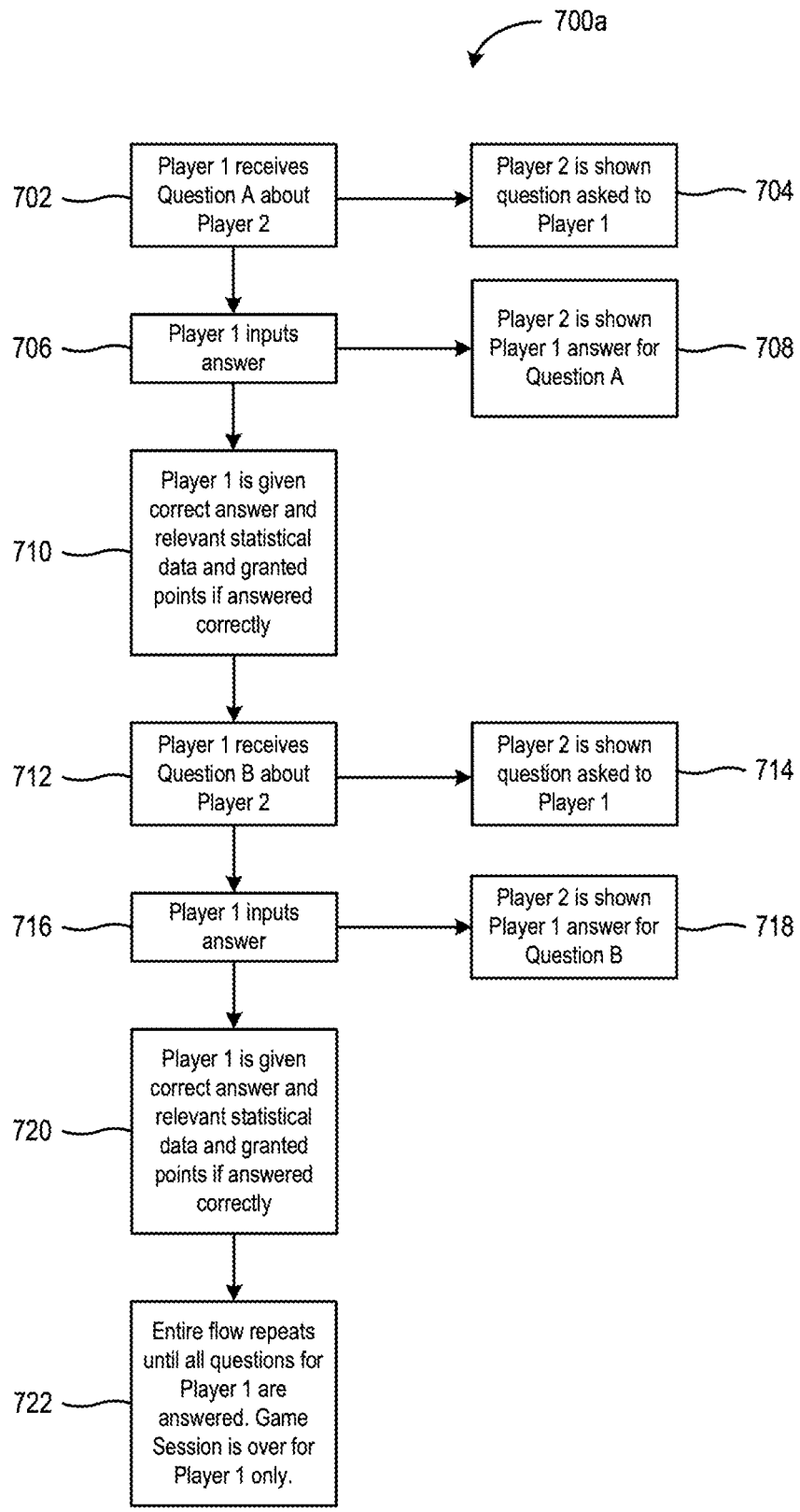
FIG. 7a illustrates a flowchart of a portion of a game session following a different process from FIG. 6 as an example embodiment, for which each user may play the game session independently from each other in yet another embodiment of the present invention.

FIG. 7a illustrates a flowchart 700a of a portion of a game session following a different process from FIG. 6 as an example embodiment, for which each user may play the game session independently from each other in yet another embodiment of the present invention. At step 702, the first user receives question A about the second user. At step 704, the second user is shown the question asked to the first user. At step 706, the first user inputs an answer. At step 708, the second user is shown the answer to question A from the first user. At step 710, the first user is given the correct answer and relevant statistical data and granted points if answered correctly. At step 712, the first user receives question B about the second user. At step 714, the second user is shown the question asked to the first user. At step 716, the first user inputs an answer. At step 718, the second user is shown the answer to question B from the first user. At step 720, the first user is given the correct answer and relevant statistical data and granted points if answered correctly. At step 722, the entire flow repeats until all questions for the first user are answered by the first user. A game session is over for the first user only. An identical process will occur for the second user, asynchronously from the first user. The game session will be completed for both the first user and the second user after they have answered all the questions assigned by the game session questionnaire (shown in 512*a*).

Figure 7B:
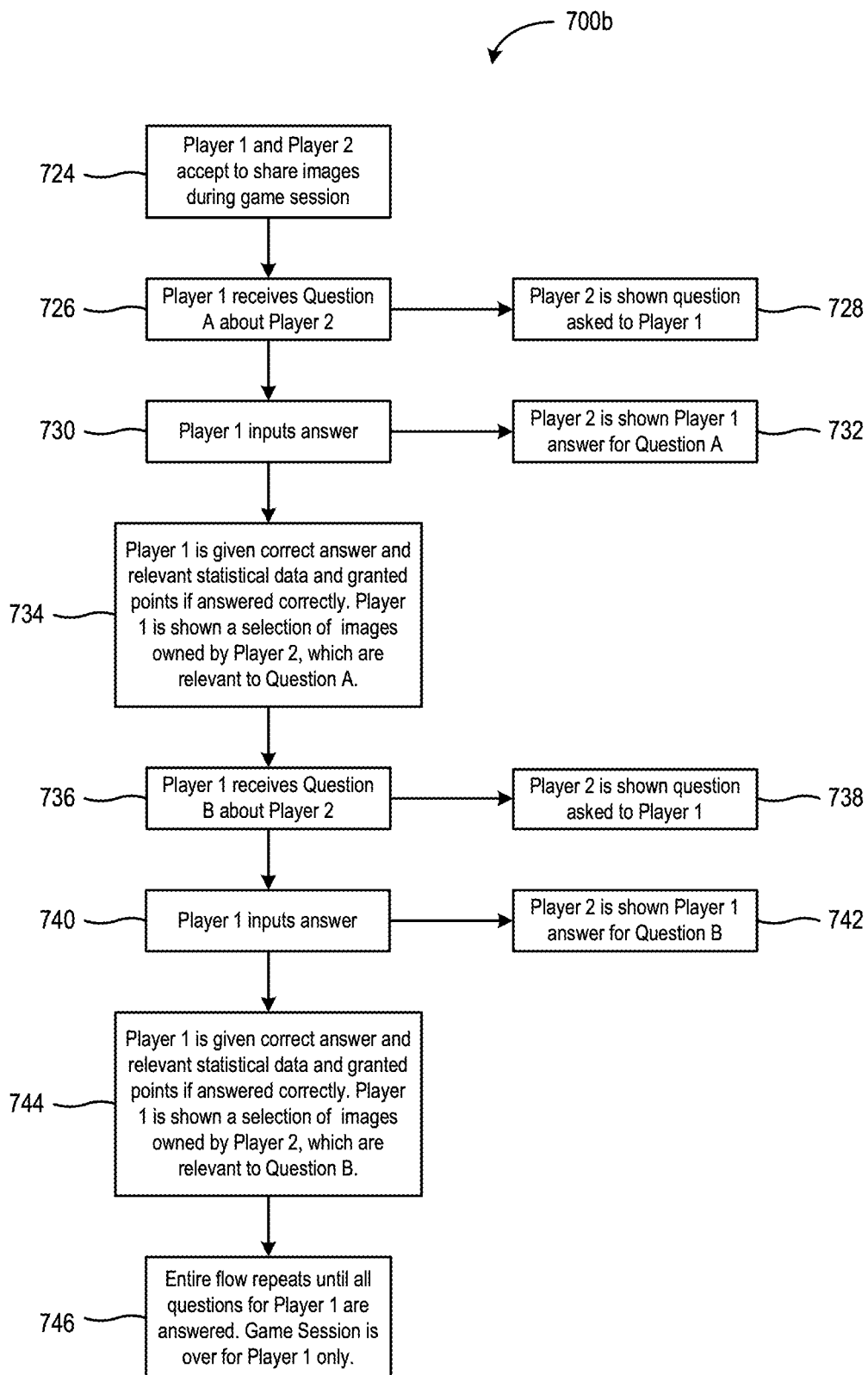
FIG. 7b illustrates a flowchart of a portion of a game session where images are shared between the users in yet another embodiment of the present invention.

FIG. 7*b* illustrates a flowchart 700*b* of a portion of a game session where images are shared between the users in yet another embodiment of the present invention. FIG. 7*b* shows a flowchart that illustrates a portion of a game session that differs from FIG. 7*a* as an example embodiment, for which each user may play the game session independently from each other and where pictures relevant to the questions asked are shared between the users. At step 724, the first user and the second user accept to share the images during the game session. At step 726, the first user receives question A about the second user. At step 728, the second user is shown the question asked to the first user. At step 730, the first user inputs an answer. At step 732, the second user is shown the answer to question A from the first user. At step 734, the first user is given the correct answer and relevant statistical data and granted points if answered correctly. The first user is shown a selection of images owned by the second user, which are relevant to question A. At step 736, the first user receives question B about the second user. At step 738, the second user is shown the question asked to the first user. At step 740, the first user inputs an answer. At step 742, the second user is shown the answer to question B from the first user. At step 744, the first user is given the correct answer and relevant statistical data and granted points if answered correctly. At step 746, the entire flow repeats until all questions for the first user are answered by the first user. The game session is over for the first user. An identical process will occur for the second user, asynchronously from the first user. The game session will be completed for both the first user and the second user after they have answered all the questions assigned by the game session questionnaire (shown in 512*a*).

Figure 7C:
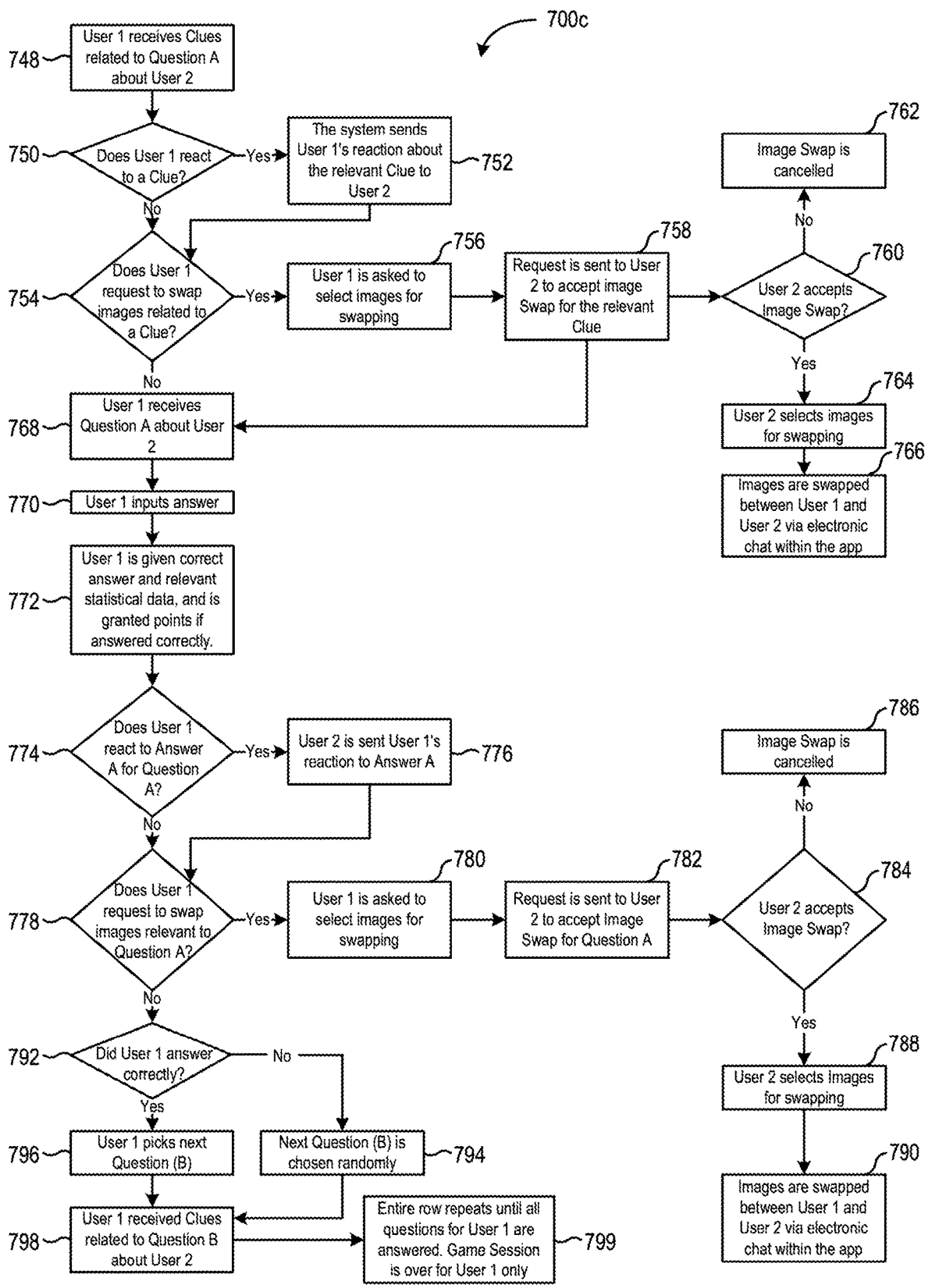
FIG. 7c illustrates a flowchart of a portion of a game session where the two users who play against each other do not know each other personally and are provided with clues for each question, as well as having the ability to request image swapping for each clue and question in yet another embodiment of the present invention.

FIG. 7*c* illustrates a flowchart 700*c* of a portion of a game session where the two users who play against each other do not know each other personally and are provided with clues for each question, as well as having the ability to request image swapping for each clue and question in yet another embodiment of the present invention. FIG. 7*c* shows a flowchart that illustrates a portion of a game session that differs from FIG. 7*b* as an example embodiment, for which the two users who play against each other do not know each other personally which is defined by the fact that neither one of the users has the other user's phone number stored in their contacts, implying that they do not know each other. In this embodiment, the users are given clues in order to have a better chance of answering correctly and thus enhancing the gameplay for users who may not know each other. Additionally for this embodiment, the users may also be requested to swap images at certain turns by their opponent and may agree or reject image swapping requests.

At step 748, the first user receives a set number of clues related to question A about the second user. At step 750, the first user is given a chance to react to the presented clues. At step 752, if the first user reacts the system sends the first user's reaction to the second user. At step 754, the first user may request to swap images in relation to a clue. At step 756, if the first user does request to swap images, they are asked to select images for swapping. At step 758, the request is sent to the second user to accept the image swap for the relevant clue. At step 760, when the second user is logged on to the mobile application he/she will be asked to accept the image swap. At step 762, if the second user chooses to decline, then the image swap is canceled. At step 764, if the second user chooses to accept the image swap, he/she will be asked to select images for swapping and, at step 766, the images will be swapped between the first user and the second user via electronic chat within the mobile application which will terminate the image swap process. At step 768, in the subsequent operation, after the clues are presented to the first user for question A, the first user will be asked question A about the second user. At step 770, the first user will input the answer. At step 772, the first user will be given the correct answer, i.e. answer A, and relevant statistical data, as well as granted points if answered correctly. At step 774, the first user may choose to react to answer A. At step 776, if so the reaction will be sent to the second user. At step 778, in the subsequent operation, the first user will have the option to swap images relevant to question A. At step 780, if the first user does request to swap images he/she is asked to select images for swapping and then a request is sent to the second user to accept the image swap for the relevant clue, at step 782. At step 784, when the second user is logged on to the mobile application, he/she will be asked to accept the image swap. At step 786, if the second user chooses to decline, then the image swap is canceled. At step 788, if the second user chooses to accept the image swap, he/she will be asked to select images for swapping and the images will be swapped between the first user and the second user via electronic chat within the mobile application, at step 790, which will terminate the image swap process. At step 792, in the subsequent operation, the system will verify if the first user answered question A correctly. At step 794, if the first user did not answer correctly, the next question will be chosen randomly. At step 796, if the first user answered correctly, he/she will be allowed to select the next question B. At step 798, once the question is selected the first user will receive the clues related to question B about the second user and a process identical to step 748 to step 796 will be repeated for question B. At step 799, the flow repeats until all the questions for the first user are answered, and the game session will be over for the first user.

Figure 8:
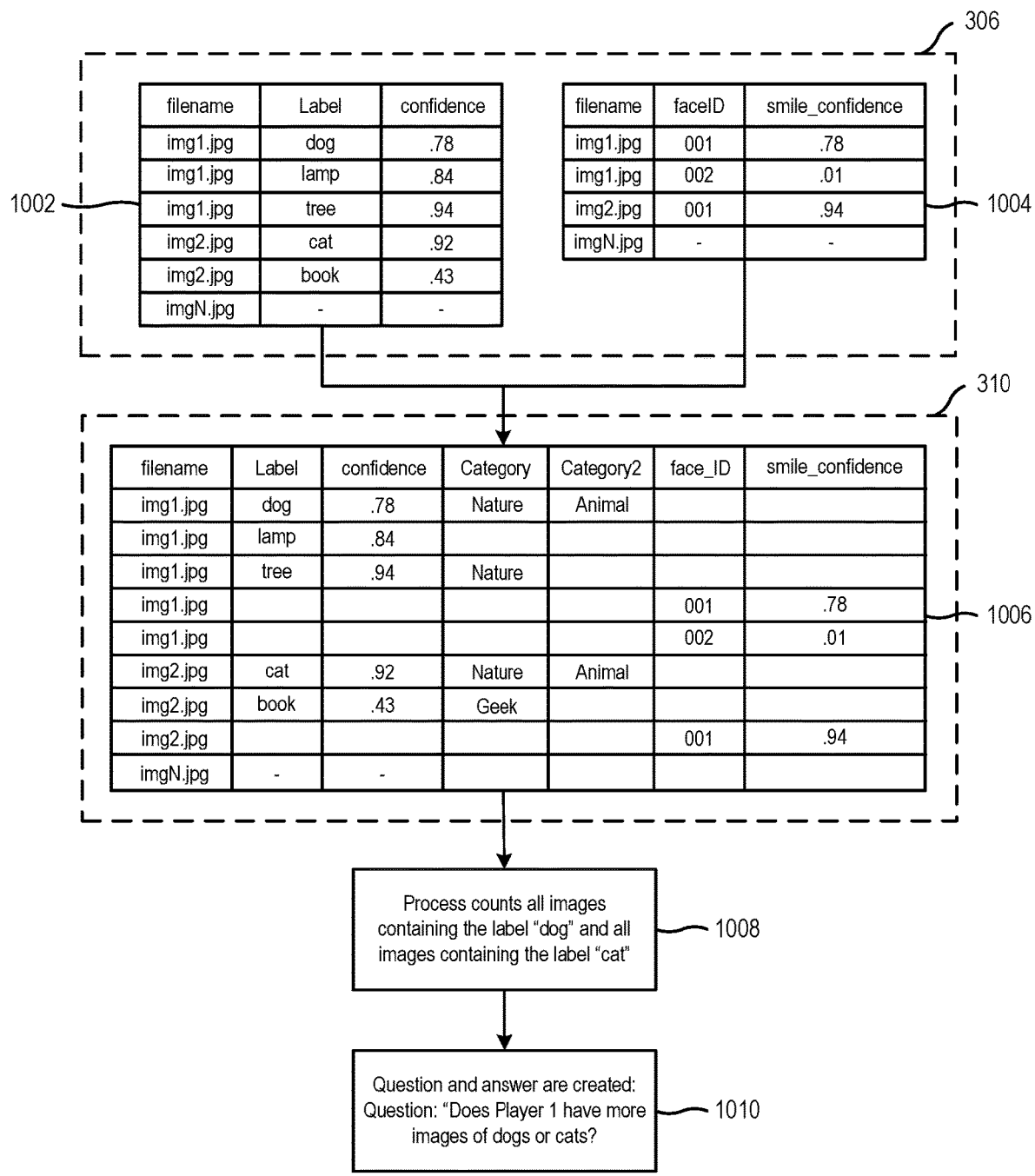
FIG. 8 illustrates a flowchart with respect to how data obtained from the machine learning models create a question for the question database, in accordance with an alternative embodiment of the present invention.

FIG. 8 illustrates a flowchart with respect to how data obtained from common machine learning models create a question for the question database (shown as 508*a*), in accordance with an alternative embodiment of the present invention. Example of the machine learning models includes but not limited to Google's ML kit using TensorFlow Lite models, or Apple's CoreML. The image label table 1002 and the faceID table 1004 are table representations of the arrays obtained from extracting image content data from common machine learning models. These two examples of extracted data are a representation of step 306 in FIG. 3. After these data arrays are evaluated 308 they are combined to form a user profile report 310, shown as a table representation in this figure in table 1006. For this particular embodiment, in step 1008 a counting process will count all the records of images containing the label "dog" as well as the label "cat". The result of this count will be the answer to the question created in step 1010 "Does the first user have more images of dogs or cats". This process will repeat for a finite number of evaluations of different nature, including using the faceID data as well as other data obtained from the images, to create a number of questions that will be the Question Database 508*a*.

Figure 9:
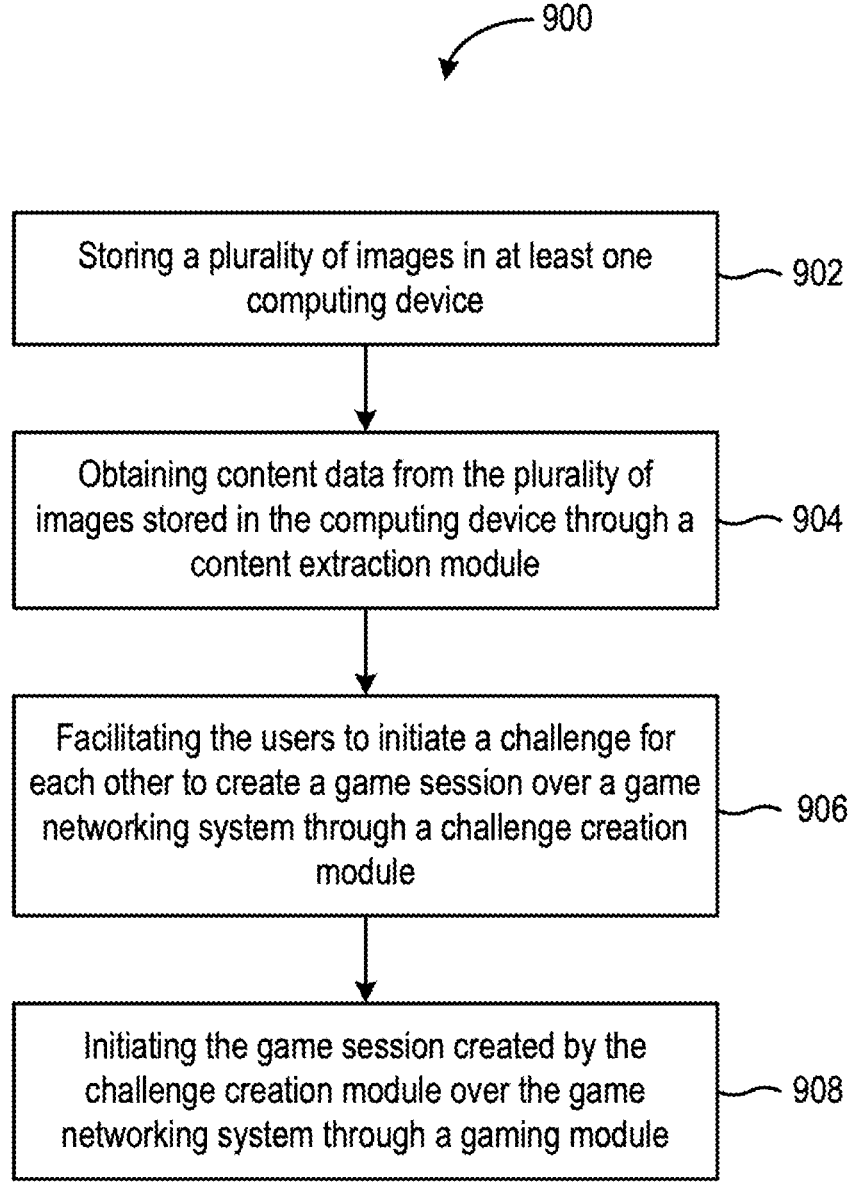
FIG. 9 illustrates a flowchart of the method for providing an online game implemented by means of a computer system, in accordance with an alternative embodiment of the present invention.

FIG. 9 illustrates a flowchart 900 of the method for providing an online game implemented by means of a computer system, in accordance with an alternative embodiment of the present invention. The method includes the step 902 of storing a plurality of images in at least one computing device. The method then includes the step 904 of obtaining content data from the plurality of images stored in the computing device through a content extraction module. The method includes step 906 of facilitating the users to initiate a challenge for each other to create a game session over a game networking system through a challenge creation module. The game session includes a friend game session and a date game session. The method includes step 908 of initiating the game session created by the challenge creation module over the game networking system through a gaming module. Thus the present invention provides a new game mechanic that uses the images owned by the users, as well as content data extracted from those images, to create a fun way to know someone more deeply and to share images with other people.

While embodiments of the present invention have been illustrated and described, it will be clear that the invention is not limited to these embodiments only. Numerous modifications, changes, variations, substitutions, and equivalents will be apparent to those skilled in the art, without departing from the scope of the invention, as described in the claims.

I claim:

1. An online game system implemented by means of a computer system comprising:
   at least one computing device to store a plurality of images;
   a game networking system accessible by a plurality of users connected over a network;
   an application server including user input data, and image extraction data pertaining to the images stored in the at least one computing device corresponding to each of the plurality of users;
   a processor; and
   a memory communicatively coupled to the processor, wherein the memory stores instructions executed by the processor, wherein the memory comprising:
      a content extraction module to obtain content data from the plurality of images stored in the at least one computing device;
      a challenge creation module to facilitate the plurality of users to initiate a challenge for each other to create a game session over the game networking system, wherein the game session comprises a friend game session and a dating game session; and
      a gaming module to initiate the game session created by the challenge creation module over the game networking system.

2. The online game system according to claim 1, wherein the content extraction module performs a first plurality of steps to obtain content data from the plurality of images stored in the at least one computing device, wherein the first plurality of steps comprising:
   installing a mobile application on the at least one computing device and allowing the mobile application to access the plurality images stored in the at least one computing device;
   extracting the plurality of images from the at least one computing device by the mobile application;
   processing the plurality of images through one or more open-source algorithms to obtain content data for each of the plurality of images;
   evaluating the content data through a text algorithm to create a user profile report; and
   transmitting the user profile report to the application server and storing the user profile report in a user profile database.

3. The system according to claim 2, wherein the challenge creation module performs a second plurality of steps to facilitate the plurality of users to initiate the challenge, wherein the second plurality of steps comprising:
   allowing a mobile application to access a plurality of contacts stored in the at least one computing device of the users;
   selecting and referring the users from the contacts to initiate the challenge by at least one of the plurality of users, wherein the plurality of users are categorized as one or more first users who initiate the challenge and one or more second users selected and referred by the first user to accept the challenge;
   determining if the mobile application is installed in the at least one computing device of the second user;
   sending a request signal to the second user to accept the challenge initiated by the user via the application server on determining that the mobile application is installed in the at least one computing device of the second user, sending an invite signal through one or more messaging platforms to the second user to install the mobile application if the mobile application is not installed in the at least one computing device of the second user and stores the challenge in the application server as a stored challenge, wherein the stored challenge is transmitted to the at least one computing device of the second user when the application server acknowledges installation of the mobile application in the at least one computing device of the second user; and
   sending a notification signal to the second user to accept the challenge through the application server, and creating the friend game session on determining phone numbers corresponding to the first user and the second user are stored in at least one computing device corresponding to the first user and the second user, and creating the date game session on determining phone numbers corresponding to the first user and the second user are not stored in at least one computing devices corresponding to the first user and the second user.

4. The system according to claim 3, wherein the gaming module performs a third plurality of steps to initiate the game session, wherein the third plurality of steps comprising:
   receiving the request signal by the application server to initiate the game session between the first user and the second user;
   examining if phone numbers of the first user and the second user are stored in the at least one computing devices corresponding to the first user and the second user to determine whether to create the friend game session or the dating game session;
   extracting the user profile reports for the first user and the second user from the user profile database;
   comparing both the user profile report to create a question database specific to the first user and the second user through an algorithmic module, wherein the question database comprising a finite number of questions to confirm statistical data obtained from the content data pertaining to the plurality of images extracted from the at least one computing device;
   selecting a discrete number of questions from the question database through a software module, wherein the selected discrete number of questions act as a game session questionnaire for the first user and the second user;

initiating the game session when the application server transmits a first question to the at least one computing device of one of the users, wherein the initiation of the game session is notified to the first user and the second user;

comparing the user profile reports of the first user and the second user to create a clues and questions database specific to the first user and the second user, wherein the clues and questions database comprising a finite number of clues to expose statistical data and questions to confirm other statistical data obtained from the content data pertaining to the plurality images extracted from the at least one computing device;

selecting a discrete number of questions from the clues and questions database, wherein the selected discrete number of questions act as a dating game session questionnaire for the first user and the second user; and initiating the game session when the application server sends a first clue to one of the first user and the second user, wherein initiation is notified to the first user and the second user.

5. A method for providing an online game implemented by means of a computer system, the method comprising steps of:

storing a plurality of images in at least one computing device;

obtaining content data from the plurality of images stored in the at least one computing device through a content extraction module;

facilitating at least one of a plurality of users to initiate a challenge for each other to create a game session over a game networking system through a challenge creation module, wherein the game session comprises a friend game session and a date game session, and wherein the plurality of users are categorized as one or more first users who initiate the challenge and one or more second users selected and referred by a first user to accept the challenge; and, initiating the game session created by the challenge creation module over the game networking system through a gaming module.

6. The method according to claim 5, wherein the content extraction module performs a first plurality of steps to obtain content data from the plurality of images stored in the at least one computing device, wherein the first plurality of steps comprising:

installing a mobile application on the at least one computing device and allowing the mobile application to access the plurality images stored in the at least one computing device;

extracting the plurality image from the at least one computing device by the mobile application;

processing the plurality images through one or more open-source algorithms to obtain content data for each image;

evaluating the content data through a text algorithm to create a user profile report; and transmitting the user profile report to an application server and storing the user profile report in a user profile database.

7. The method according to claim 6, wherein the challenge creation module performs a second plurality of steps to facilitate the plurality of users to initiate the challenge, wherein the second plurality of steps comprising:

allowing the mobile application to access a plurality of contacts stored in the at least one computing device of the plurality of users;

selecting and referring the plurality of users from the contacts to initiate the challenge by the user;

determining if the mobile application is installed in the at least one computing device of the second user;

sending a request signal to the second user to accept the challenge initiated by the first user via the application server on determining that the mobile application is installed in the at least one computing device of the second user, sending an invite signal through one or more messaging platforms to the second user to install the mobile application if the mobile application is not installed in the at least one computing device of the second user and stores the challenge in the application server as a stored challenge, wherein the stored challenge is transmitted to the at least one computing device of the second user when the application server acknowledges installation of the mobile application in the at least one computing device of the second user; and sending a notification signal to the second user to accept the challenge through the application server, and creating the friend game session on determining phone numbers corresponding to the first user and the second user are stored in the at least one computing devices corresponding to the first user and the second user, and creating the date game session on determining phone numbers corresponding to the first user and the second user are not stored in the at least one computing devices corresponding to the first user and the second user.

8. The method according to claim 7, wherein the gaming module performs a third plurality of steps to initiate the game session, wherein the third plurality of steps comprising:

receiving the request signal by the application server to initiate the game session between the first user and the second user;

examining if phone numbers of the first user and the second user are stored in the at least one computing devices corresponding to the first user and the second user to determine whether to create the friend game session or the dating game session;

extracting the user profile reports for the first user and the second user from the user profile database;

comparing both the user profile report to create a question database specific to the first user and the second user through an algorithmic module, wherein the question database comprising a finite number of questions to confirm statistical data obtained from the content data pertaining to the plurality of images extracted from the at least one computing device;

selecting a discrete number of questions from the question database through a software module, wherein the selected discrete number of questions act as a game session questionnaire for the first user and the second user;

initiating the game session when the application server transmits the first question to the at least one computing device of one of the users, wherein the initiation of the game session is notified to the first user and the second user;

comparing the user profile reports of the first user and the second user to create a clues and questions database specific to the first user and the second user, wherein the clues and questions database comprising a finite number of clues to expose statistical data and questions to confirm other statistical data obtained from the content data pertaining to the plurality images extracted from the at least one computing device;

selecting a discrete number of questions from the clues and questions database, wherein the selected discrete number of questions act as a dating game session questionnaire for the first user and the second user; and initiating the game session when the application server sends the first clues to one of the first user and the second user, wherein the initiation of the game session is notified to the first user and the second user.

\* \* \* \* \*